Dec. 12, 1961     C. E. ELLIS     3,013,168
SUPRASYNCHRONOUS MOTOR
Filed April 20, 1959     5 Sheets-Sheet 1
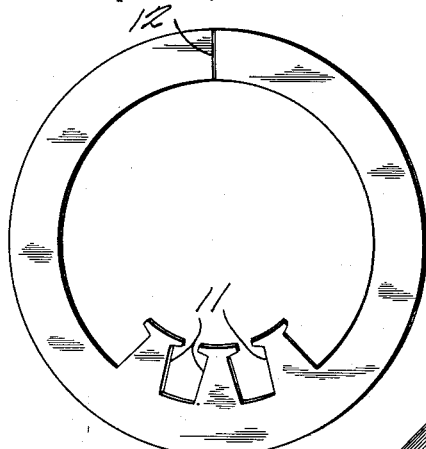
FIG. 2
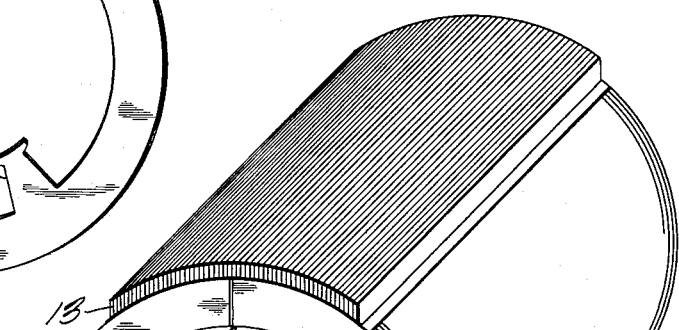
FIG. 1
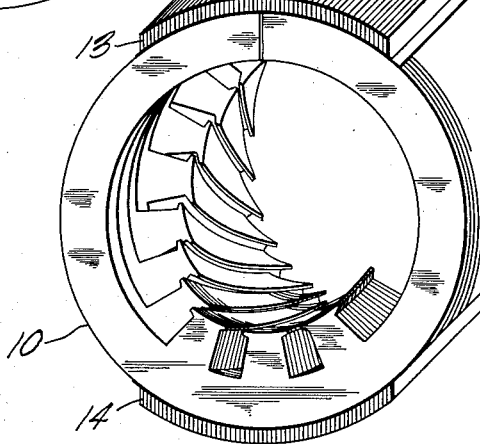
FIG. 3
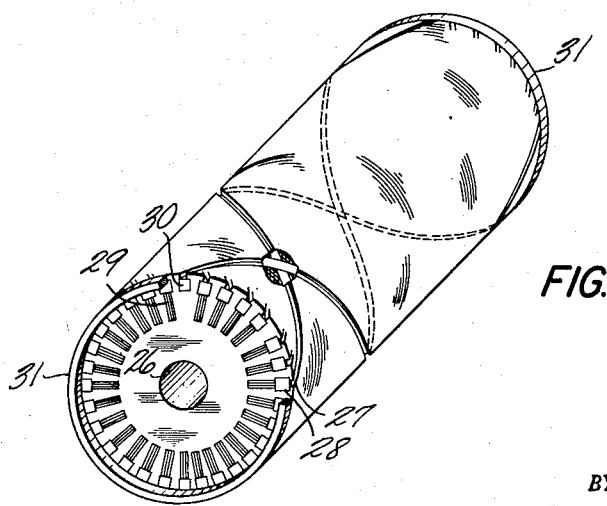
INVENTOR.
CHARLES E. ELLIS
BY
his     ATTORNEYS INVENTOR.
CHARLES E. ELLIS
BY
his ATTORNEYS Dec. 12, 1961 C. E. ELLIS 3,013,168
SUPRASYNCHRONOUS MOTOR
Filed April 20, 1959 5 Sheets-Sheet 3

INVENTOR.
CHARLES E. ELLIS
BY
his ATTORNEYS

Dec. 12, 1961   C. E. ELLIS   3,013,168
SUPRASYNCHRONOUS MOTOR
Filed April 20, 1959   5 Sheets-Sheet 4

INVENTOR.
CHARLES E. ELLIS
BY
his   ATTORNEYS

Dec. 12, 1961

C. E. ELLIS 3,013,168

SUPRASYNCHRONOUS MOTOR

Filed April 20, 1959

INVENTOR.
CHARLES E. ELLIS
BY
his ATTORNEYS.

United States Patent Office 3,013,168
Patented Dec. 12, 1961

3,013,168
SUPRASYNCHRONOUS MOTOR
Charles E. Ellis, 40 Armour Road, Mahwah, N.J.
Filed Apr. 20, 1959, Ser. No. 807,363
10 Claims. (Cl. 310—166)

This invention relates to alternating current dynamo electric machinery, and more particularly to an alternating current motor that can be operated effectively at speeds in excess of the synchronous speed of conventional motors having an equal number of poles and operating at the same line frequency.

Conventional alternating current induction or synchronous motors have the well-known disadvantage that they cannot operate at speeds above a fixed limit. This limit, called the synchronous speed, is fixed by the frequency of the alternating current power source and by the number of poles per phase of the motor. A two-pole per phase motor energized by a 60 cycle source, for example, cannot be operated at a speed greater than 3600 revolutions per minute, and a four-pole per phase motor can operate at no more than half that speed.

It is, therefore, an object of the present invention to provide an alternating current dynamo electric machine capable of operating at speeds above the synchronous speeds of conventional motors having the same number of poles per phase and energized by A.C. of the same line frequency.

This and other objects of the invention are attained by providing a dynamo electric alternating current motor having a stator provided with magnetic structure and winding means for causing a magnetic flux wave to travel along a spiral path in a first direction, a rotor mounted adjacent to the stator and having a plurality of conductor bars spiralling in the opposite direction, and shorting conductor means having its opposite ends connected to opposite rotor end rings, respectively, and spiralling substantially parallel to the path travelled by the stator magnetic flux wave, and being connected to the respective rotor conductors wherever it crosses them. The shorting conductor means provide extra paths so that currents may flow in opposite directions in each of the rotor conductor bars without cancelling each other out. Voltage is not induced in the shorting conductor means by the stator magnetic flux because they lie in a path parallel to that followed by the travelling flux waves.

In a first embodiment of the invention, a cylindrical motor is provided wherein the spiral paths followed by the travelling flux waves, the conductor bars and the shorting bars have a pitch of a constant finite value and a constant radius. The invention may also be embodied in a disc-type motor, in which event the spiral paths have a pitch of zero and a gradually diminishing radius.

This invention may be better understood from the following detailed description of representative embodiments of the invention taken in conjunction with the accompanying drawings in which:

FIG. 1 is a schematic illustration of the stator magnetic field structure for a cylindrical motor constructed according to the invention;

FIG. 2 shows a typical stator lamination that may be employed in the stator shown in FIG. 1;

FIG. 3 illustrates a rotor adapted to be used in conjunction with the stator shown in FIG. 1;

The cylindrical motor stator shown in FIG. 1 may be formed of a plurality of stacked radial magnetic laminations 10 insulated from each other in the conventional manner. Preferably, each lamination is formed with three inwardly extending teeth 11 (FIG. 2) and is punched or otherwise formed with a cut or slit 12 for the purpose of reducing eddy current losses. Two groups 13 and 14 of axial stator laminations are positioned on opposite sides of the stator and are electrically insulated from the radial laminations by a thin insulating film.

Figure 4:
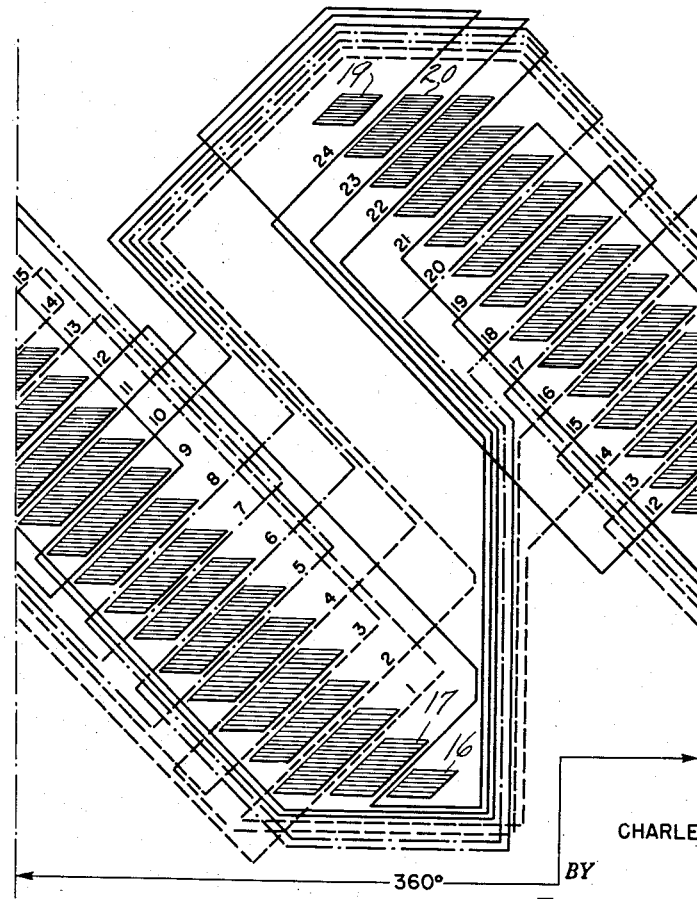

The manner in which the teeth 11 are positioned around the inside of the stator to form poles is best illustrated in FIGS. 1 and 4.

FIG. 4 is a schematic illustration of the stator after it has been cut open along a generatrix of the cylinder and laid out flat. It will be observed that the teeth 11 of the stacked laminations form a plurality of protruding teeth separated by winding slots which form a spiral path inside of the stator. Each tooth and slot is offset in a circular direction as well as in an axial direction. The teeth 16 and 17 are shortened because they are at one end of a stator but thereafter the teeth are of equal length, each tooth being disposed at an angle of 45° to the longitudinal axis of the stator. Similarly, the teeth 19 and 20 at the other end of the stator are shorter than the ones intermediate the stator ends. The spiral angle of the array of poles is thus 45° from the stator cylindrical axis.

Figure 5:
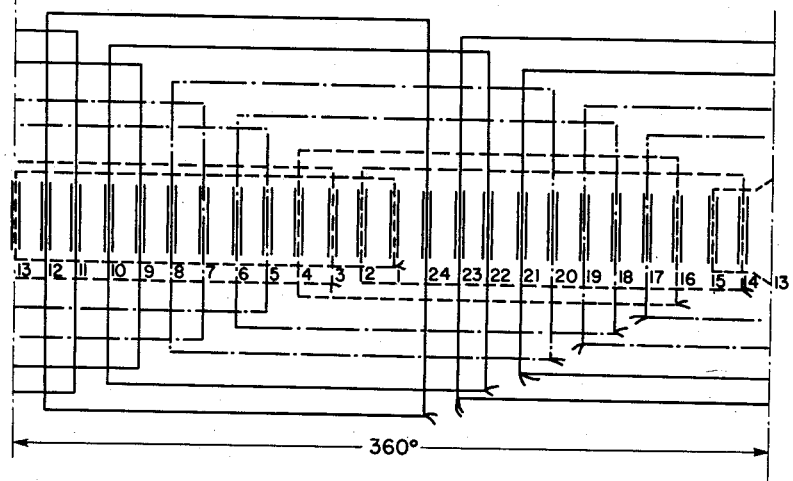
FIGS. 4 and 5 are schematic illustrations of a representative winding scheme for the stator shown in FIG. 1.

The wiring scheme for the stator of FIG. 1 is shown in FIGS. 4 and 5 wherein the windings connected to the phase A of a three-phase supply are indicated by a solid line, the windings connected to the phase B by a dash-dot line, and the windings connected to the phase C by a dotted line. In the representative stator shown in FIG. 4, there are twenty-four slots which carry three-phase windings to form a two-pole motor. The winding arrangement is illustrated in FIG. 5 before cutting and spreading as required for 45° skew in the finished stator. In FIGS. 4 and 5, the slots are numbered consecutively from 1 to 24. When a three-phase supply is connected to the windings, it will be understood that two waves of magnetic flux of opposite polarity will move in a spiral path along the face of the magnetic structure formed by the teeth on the stator laminations.

A rotor adapted for use with the stator of FIG. 1 is shown in FIG. 3 and it includes a plurality of stacked radial laminations insulated from each other in a conventional manner and mounted on a shaft 26. A plurality of spiral grooves 27 are formed in the outer surface of the rotor, each of which has mounted therein an insulated rotor conductor bar 28 and a plurality of axially extending laminations 29 of magnetic material insulated from the sides of the slot. The rotor also carries one or more shorting bars 30 which spiral around the rotor in a direction opposite to the rotor conductor bars and parallel to the spiral angle of the stator tooth array. The shorting bar 30 is connected to each of the rotor conductor bars at the point of crossing and its opposite ends are connected to the usual rotor end rings 31.

In the illustrative embodiment of the invention shown in FIG. 3, the length of the rotor is equal to its circumference and the conductor bars 28 and the shorting bar 30 make an angle of 45° to the end rings 31. Under these conditions, the conductor bars and the shorting bar make one complete turn around the rotor while travelling one rotor length. The rotor also has the same length as the stator shown and the spiral path travelled by the magnetic flux waves generated by the windings is exactly perpendicular to the spiral rotor conductor bars 28 to provide a minimum of stator leakage reactance, and is exactly parallel to the path of the shorting bar 30.

In operation, the stator windings are connected to a three-phase power supply and two magnetic flux waves travel along a spiral path coaxial with the rotor shaft 26. Each north magnetic pole induces a voltage in the rotor conductor bars in a first direction and the south magnetic pole, which is 180° away from the north magnetic pole, induces an opposite voltage in the same rotor conductor bars.

Since the voltages induced in each conductor are opposite in polarity, without the shorting bar 30 no current would flow in the conductors and the rotor would not rotate. However, the shorting bar 30 divides each conductor 28 into two parts and connects the respective parts in separate circuits in which current can flow when opposite voltages are induced in the conductor. Hence, current can flow through the conductor bars, and, since these are perpendicular to the direction of movement of the magnetic flux waves, torque will be exerted on the rotor.

Moreover, the magnetic flux waves travelling in the spiral direction clockwise tend to pull the rotor conductor bars with it so that the rotor will tend to make two complete revolutions each time a wave of maximum flux density travels the axial length of the stator. In other words, it will rotate at a speed twice the speed normally obtainable with a conventional alternating current induction motor.

It will be apparent that a plurality of shorting bars 30 may be used, if desired. Preferably, the ends of such bars should be equally spaced around the circumference of the rotor and they should be parallel to one another. Also, provision may be made for more than one spiral pole array around the stator. To this end, additional teeth could be formed in the radial stator laminations and additional windings inserted therein for causing one or more additional waves of magnetic flux to travel spirally around the stator. There is a limit to the number of spirally travelling magnetic fields that can be employed, however, since it would not be advantageous to have more than 50% of the inside of the stator taken up by magnetic poles. At least half of the stator radial laminations should be left free of poles so that the magnetic flux and induced currents in the rotor bars will have an adequate return path.

Figure 7:
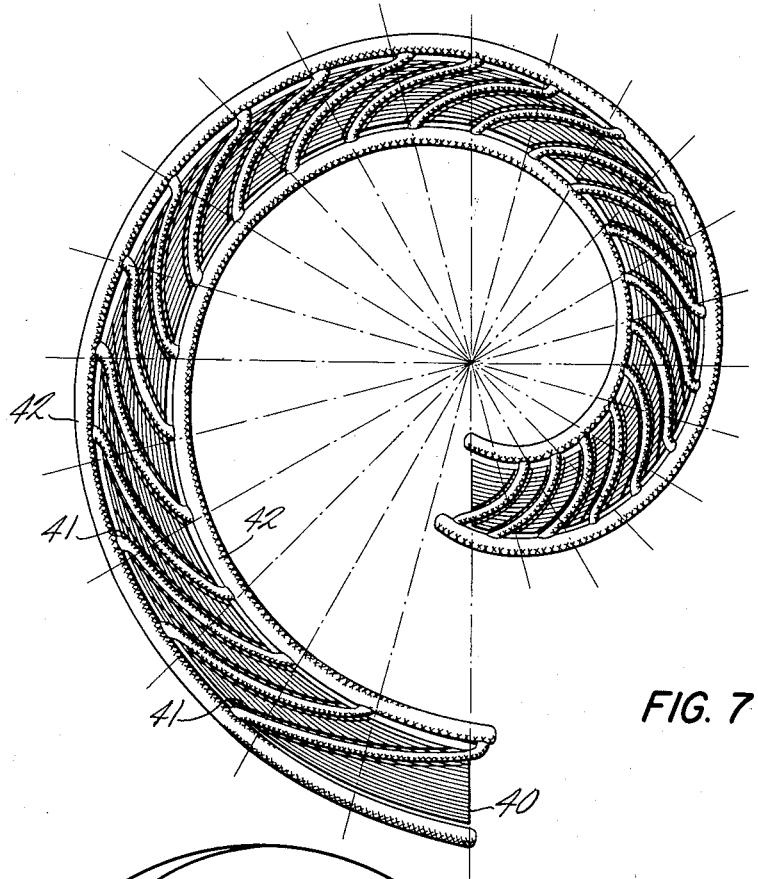
FIG. 7 is an illustration of a stator for the disc-type motor of FIG. 6.

FIGS. 6-9 illustrate a disc-type motor embodying the invention. As shown in FIG. 7, the stator is made up of a plurality of laminations 40 arranged to form a spiral path and each having a plurality of slots 41 formed in one edge thereof in which windings 42 are adapted to be received. It is similar to the stator shown in FIG. 2 in that it has twenty-four slots. The windings 42 are also connected so that two waves of maximum magnetic flux density, one a north pole and the other a south pole separated from each other by 180 angular degrees, travel along the spiral path defined by the laminations.

The rotor (FIGS. 8 and 9) includes a plurality of radially extending stacks of magnetic laminations 50 and a plurality of concentric laminations 51. The two groups of laminations 50 and 51 are fastened together but are electrically insulated from each other. Every concentric lamination 51 is provided with a narrow slit 54 for the purpose of reducing eddy current losses. It should be understood that the laminations 51 could be formed from one long strip of lamination material spirally wound on a mandrel, in which case the slits 54 would be unnecessary because there would be no closed loops.

Spiral slots 56 are formed in the edges of the laminations 51 in which rotor conductor bars 52 are adapted to be received. The conductor bars 52 are spirally curved in a direction opposite the direction of the laminations 40 of the stator. The conductor bars 52 are joined together at each end by an end ring 53. A shorting bar 55 is connected to each of the end rings 53 and also to each of the conductor bars 52 at the point of crossing.

Figure 6:
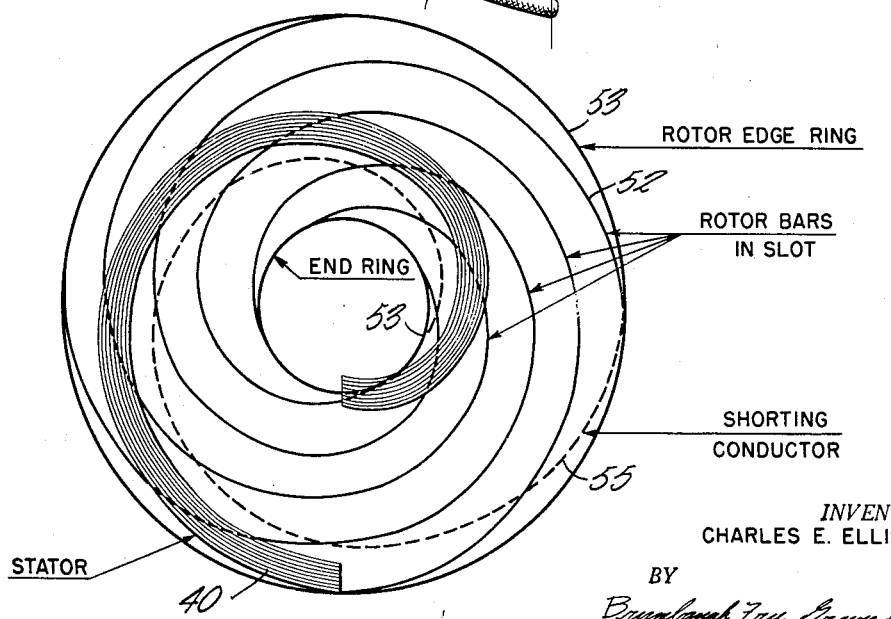
FIG. 6 illustrates schematically a stator and a rotor for a disc-type motor constructed in accordance with the invention.
Figure 8:
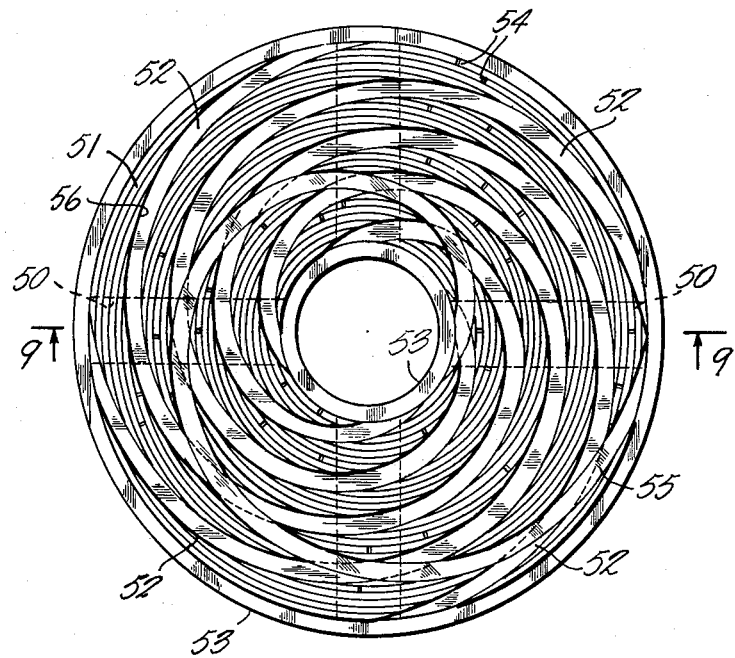
FIG. 8 is an illustration of a rotor for the disc-type motor of FIG. 6.
Figure 9:
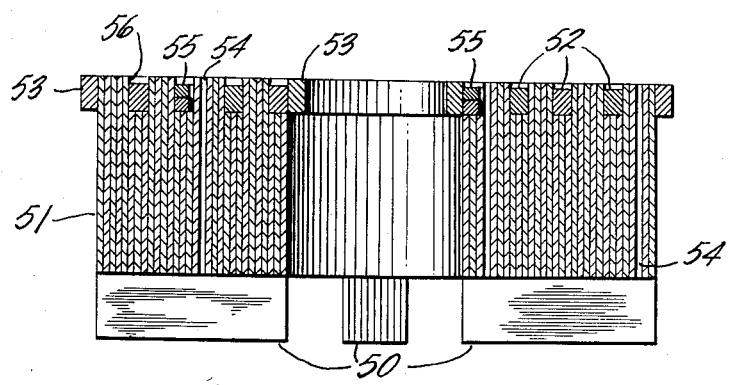
FIG. 9 is a sectional view of the rotor taken along the line 9—9 of FIG. 8.

As can be seen from FIG. 6, the path defined by the stator laminations is parallel to the spiral path defined by the shorting conductor 55. Also, the slots 41 carrying the windings 42 on the stator are parallel to the rotor conductor bars 52. The stator current, the conductor bars 52 and the shorting conductor 55 all make one 360° revolution while following a spiral path.

When current flows through the windings 42, a travelling wave of magnetic flux, including north and south magnetic poles 180° apart in space, will be set up by the stator. This wave will appear to the rotor to be travelling inwardly at a rate of 60 times per second when the windings are connected to a 60 cycle source. Moreover, the north and south poles, respectively, will induce voltages of opposite polarity in each rotor conductor bar. However, by reason of the presence of the shorting bar 55, the induced voltage will cause currents to flow in the rotor conductors so that torque will be developed. As in the embodiment of FIG. 1, the travelling wave of magnetic flux tends to pull the rotor conductor bars with it, causing the rotor to rotate. Since the rotor will tend to make two complete revolutions each time a wave of magnetic flux travels over its spiral path, the rotor will tend to rotate at twice synchronous speed. Under load, of course, the rotor will not rotate at this speed but will slip back to a speed less than twice synchronous speed.

It should be noted that speeds in excess of twice synchronous speed can be attained by designing the rotor and the stator so that the travelling wave of magnetic flux describes an arc subtending an angle of more than 360° for each cycle. In other words, the spiral path defined by the stator laminations could be designed to make one or more complete turns during one revolution of the stator. In this event, the rotor conductors and one or more shorting conductor bars would have to be similarly constructed so that they turn through the same number of angular degrees per revolution as the spiral path on the stator. Regardless of the design of the motor, the shorting conductor bars 55 should preferably be parallel to the spiral stator path and the magnetic flux wave in the stator should always travel at an angle normal to the rotor conductor bars 52.

More than one two-pole travelling wave could be provided for on the stator of the disc-type motor, as shown in the embodiment of FIG. 1. The spiral paths travelled should, of course, be parallel to each other and should cover the same number of angular degrees and be symmetrically disposed. Here again, however, the area of the stator not occupied by the paths traversed by the magnetic fields should be at least as great as the area occupied by the pole faces.

The power obtainable from a disc motor of the type described could be still further increased by stacking a plurality of stators and rotors and connecting all of the rotors to a common drive shaft.

Figure 10:
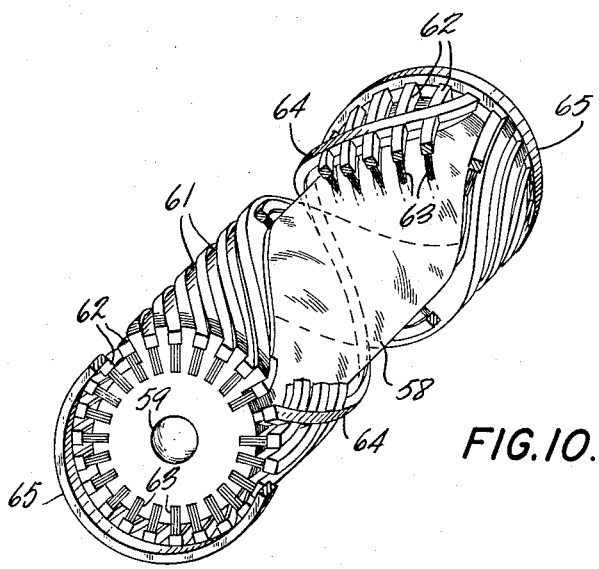
FIG. 10 is an illustration of a rotor for synchronous-induction motor constructed in accordance with the invention.
Figure 11:
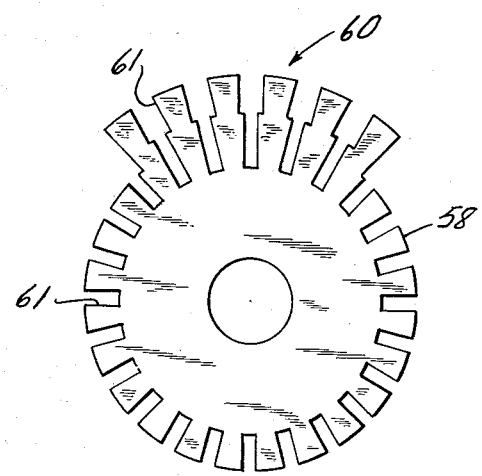
FIG. 11 shows a typical rotor lamination that may be employed in the rotor shown in FIG. 10.

In FIGS. 10 and 11 is illustrated a rotor for a motor constructed in accordance with the invention that is capable of operation as a synchronous-induction motor. This rotor is very similar to the cylindrical rotor shown in FIG. 3 and is adapted to be used in conjunction with the stator shown in FIG. 1.

With reference to FIGS. 10 and 11, the rotor includes a plurality of stacked radial laminations 58 insulated from each other in a conventional manner and mounted on a shaft 59. Each lamination 58 is formed with a section 60 which has a greater radial length than the remainder of the lamination and the laminations are stacked so the sections 60 form a spiral ridge around the rotor. The spiral path followed by the ridge is parallel to the path followed by the conductor bars 30, FIG. 3.

A plurality of spiral grooves 61 are formed in the outer surface of the rotor and receive a plurality of insulated rotor conductor bars 62 and axially extending laminations 63. The rotor also carries one or more shorting bars 64 which spiral around the rotor in a direction opposite to the rotor conductor bars 62 and are connected to the bars 62 at each crossing. An end ring 65 connects all of the conductor bars 62 and the shorting bars 64 together at each end of the rotor. The conductor bars 62 and the axial laminations 63 are held in place by a suitable means such as a plastic material that surrounds the bars and the laminations and is flush with the upper surface of the spiral ridge.

In operation, a motor equipped with a rotor of the type shown in FIG. 10 operates similar to a conventional synchronous-induction motor but at higher speeds. The squirrel cage winding brings the motor up to about 95% of double synchronous speed and then, load permitting, the rotor is pulled into step with the spiralling waves of flux and rotates at a constant, double synchronous speed.

In the cylindrical form of motor shown in FIGS. 1-3 and 10, it would be desirable to provide thrust bearings on the ends of the shafts 26 and 59, since the rotating magnetic flux in the stator exerts an axial force on the rotor as well as a radial force.

The invention thus provides new and useful alternating current induction motor apparatus that is capable of operating at speeds above synchronous speed. Further, it may be embodied in cylindrical or disc-type configurations as described above.

While particular embodiments of the present invention have been shown and described for purposes of illustration, it is apparent that changes and modifications may be made without departing from this invention in its broader aspects. Therefore, the invention described herein is not to be construed as limited to the specific embodiment described but is intended to encompass all modifications thereof coming within the scope of the following claims.

I claim:
1. In a suprasynchronous polyphase motor, the combination of a stator, a plurality of polyphase windings inductively coupled to said stator for causing a magnetic flux wave to travel along a spiral path in a first direction, a rotor mounted adjacent said stator and separated therefrom by a relatively narrow air gap, a plurality of conductor bars carried by said rotor and insulated therefrom, each of said conductor bars being shaped in the form of a spiral having a direction opposite said first direction, and conductor means carried by said rotor and electrically connected to said conductor bars, said conductor means being shaped as a spiral having the same direction as the path of travel of said magnetic flux wave.

2. A suprasynchronous polyphase motor as in claim 1 wherein the spiral path of travel of said magnetic flux wave, the spiral conductor bars and the spiral conductor means have zero pitch and a gradually diminishing radius.

3. A suprasynchronous polyphase motor as in claim 1 wherein the spiral path of travel of said magnetic flux wave, the spiral conductor bars and the spiral conductor means have a pitch of a finite value and a radius of a constant value.

4. In a suprasynchronous polyphase motor, the combination of a rotor, a plurality of conductor bars carried by said rotor and insulated therefrom, each of said conductor bars being formed in the shape of a spiral having a first direction, shorting conductor means carried by said rotor and insulated therefrom, said shorting conductor means being electrically connected to said conductor bars and being formed in the shape of a spiral advancing in a second direction opposite said first direction, end rings carried by said rotor at each end and connected to said conductor bars and to said shorting conductor means, a stator disposed adjacent said rotor, a plurality of slots formed in said stator, and polyphase winding means in said slots for causing a wave of magnetic flux to travel over said conductor bars along a spiral path having a direction opposite said first direction.

5. In a suprasynchronous polyphase motor, the combination of a cylindrical rotor, means forming a low reluctance, low eddy current loss, magnetic path extending longitudinally of said rotor, means forming a low reluctance, low eddy current loss, magnetic path extending radially of said rotor, a plurality of conductors carried by said rotor and insulated therefrom, each of said conductors being shaped in the form of a spiral coaxial with said rotor, a shorting bar carried by said rotor and insulated therefrom, said shorting bar being shaped in the form of a spiral coaxial with said rotor but opposite in direction to the direction of said spiral conductor bars and being electrically connected to said conductors wherever it crosses the same, a plurality of end rings carried by said rotor at each end and insulated therefrom, said end rings being connected to the ends of said conductor bars and to the ends of said shorting bar, a cylindrical stator, a magnetic field structure on said stator and separated from said rotor by a relatively narrow air gap, means carried by said stator and extending longitudinally of said rotor forming a low reluctance, low eddy current loss, magnetic path, means carried by said stator and extending radially of said rotor forming a low reluctance, low eddy current loss, magnetic path, a plurality of polyphase windings inductively coupled to said magnetic field structure for causing a magnetic flux wave to traverse a spiral path coaxial with said stator but having a direction opposite the direction of said spiral rotor conductors.

6. In a suprasynchronous motor, the combination of a disc-like rotor having a plurality of spiral conductors originating at angularly spaced apart points near the axis of rotation of said rotor, inner and outer end rings connected to the opposite ends of said conductors, respectively, a disc-like stator coaxial with said rotor, a magnetic field structure on said stator, polyphase windings inductively coupled to said field structure for causing a magnetic flux wave to travel across said conductors in a spiral path opposite in direction to the direction of said conductors, and a shorting conductor on said rotor formed in the shape of a spiral having a direction opposite to the direction of said spiral conductors, said shorting conductor having its ends connected to said inner and outer end rings, respectively, and being electrically connected to each of said rotor conductors where it crosses the same.

7. In a suprasynchronous polyphase motor, the combination of relatively rotatable rotor and stator members, means on one of said members for producing a magnetic field travelling in a spiral path, a plurality of conductors on the other of said members, each of said conductors being formed in the shape of a spiral coaxial with the path of travel of said magnetic field but opposite in direction thereto, and means electrically connecting portions of each of said conductors in separate branch circuits.

8. A suprasynchronous polyphase motor as in claim 7 together with means on said one member for producing a second magnetic field travelling in a second spiral path parallel to the path of travel of the first magnetic field.

9. In a suprasynchronous polyphase motor, the combination of relatively rotatable rotor and stator members, means on one of said members for producing a magnetic field travelling in a spiral path, a plurality of conductors carried by the other of said members, each of said conductors being formed in the shape of a spiral coaxial with the path of travel of said magnetic field but opposite in direction thereto, and means electrically connecting portions of each of said conductors in separate branch circuits, said conductor carrying member having an upwardly extending ridge travelling parallel to the path of travel of said conductor bars.

10. In a suprasynchronous polyphase motor, the combination of a rotor, a plurality of conductor bars carried by said rotor and insulated therefrom, each of said conductor bars being formed in the shape of a spiral having a first direction, shorting conductor means carried by said rotor and insulated therefrom, said shorting conductor means being electrically connected to said conductor bars and being formed in the shape of a spiral advancing in a second direction opposite said first direction, end rings carried by said rotor at each end and connected to said conductor bars and to said shorting conductor means, a stator disposed adjacent said rotor, a plurality of slots formed in said stator, polyphase winding means in said slots for causing a wave of magnetic flux to travel over said conductor bars along a spiral path having a direction opposite said first direction, said rotor having an upwardly extending ridge travelling parallel to the path of travel of said conductor bars.

References Cited in the file of this patent
UNITED STATES PATENTS

| | | |
|---|---|---|
| 2,149,569 | Barrett | Mar. 7, 1939 |
| 2,848,675 | Williams et al. | Aug. 19, 1958 |
| 2,856,573 | Williams et al. | Oct. 14, 1958 |

FOREIGN PATENTS

| | | |
|---|---|---|
| 545,345 | France | July 19, 1922 |
| 1,056,718 | Germany | May 6, 1959 |